(12) United States Patent
Steib et al.

(10) Patent No.: US 7,449,508 B2
(45) Date of Patent: Nov. 11, 2008

(54) FLAME RETARDANT COMBINATION FOR THERMOPLASTIC POLYMERS

(75) Inventors: Christian Steib, Steppach (DE); Sebastian Hoerold, Diedorf (DE)

(73) Assignee: Clariant Produkte (Deutschland) GmbH, Sulzbach (DE)

( * ) Notice: Subject to any disclaimer, the term of this patent is extended or adjusted under 35 U.S.C. 154(b) by 378 days.

(21) Appl. No.: 11/065,767

(22) Filed: Feb. 25, 2005

(65) Prior Publication Data

US 2005/0234161 A1 Oct. 20, 2005

(30) Foreign Application Priority Data

Feb. 27, 2004 (DE) ........................ 10 2004 009 455

(51) Int. Cl.
*C08K 5/5313* (2006.01)
(52) U.S. Cl. ..................... 524/126; 524/99; 524/100; 524/101; 524/133
(58) Field of Classification Search ........... 524/99–101, 524/126, 133
See application file for complete search history.

(56) References Cited

U.S. PATENT DOCUMENTS

| | | | |
|---|---|---|---|
| 3,900,444 A | 8/1975 | Racky et al. | |
| 4,036,811 A | 7/1977 | Noetzel et al. | |
| 5,780,534 A | 7/1998 | Kleiner et al. | |
| 6,013,707 A | 1/2000 | Kleiner et al. | |
| 6,207,736 B1 | 3/2001 | Nass et al. | |
| 6,255,371 B1 | 7/2001 | Schlosser et al. | |
| 6,365,071 B1 | 4/2002 | Jenewein et al. | |
| 6,509,401 B1 | 1/2003 | Jenewein et al. | |
| 6,547,992 B1 * | 4/2003 | Schlosser et al. | 252/609 |
| 7,087,666 B2 * | 8/2006 | Hoerold et al. | 524/100 |
| 2004/0225040 A1 | 11/2004 | Hoerold | |
| 2005/0004277 A1 | 1/2005 | Hoerold et al. | |
| 2005/0011401 A1 | 1/2005 | Bauer et al. | |
| 2005/0014874 A1 | 1/2005 | Hoerold et al. | |
| 2005/0014875 A1 | 1/2005 | Knopet al. | |
| 2005/0049339 A1 * | 3/2005 | Knop et al. | 524/115 |
| 2005/0101708 A1 * | 5/2005 | Knop et al. | 524/115 |
| 2006/0020064 A1 | 1/2006 | Bauer et al. | |
| 2006/0183835 A1 | 8/2006 | Hoerold et al. | |
| 2006/0287418 A1 | 12/2006 | Bauer et al. | |
| 2007/0072967 A1 | 3/2007 | Nass et al. | |

FOREIGN PATENT DOCUMENTS

| | | |
|---|---|---|
| DE | 2252258 | 5/1974 |
| DE | 2447727 | 4/1976 |
| DE | 19614424 | 10/1997 |
| DE | 19734437 | 2/1999 |
| DE | 19737727 | 7/1999 |
| DE | 19933901 | 2/2001 |
| EP | 0699708 | 3/1996 |
| WO | WO 96/16948 | 6/1996 |
| WO | WO 97/39053 | 10/1997 |
| WO | WO 98/39306 | 9/1998 |

OTHER PUBLICATIONS

EPO Search Report for EP 05003218, mailed May 10, 2005.
Zweifel, "Plastics Additives Handbook", 5th ed. Carl Hanser Werlag, Munich; pp. 80-84 (2000).

* cited by examiner

*Primary Examiner*—Peter Szekely
(74) *Attorney, Agent, or Firm*—Richard P. Silverman; Anthony A. Bisulca

(57) ABSTRACT

The invention relates to a novel flame retardant and stabilizer combined for thermoplastic polymers, which comprises, as component A, from 20 to 80% by weight of a phosphinic salt of the formula (I) and/or of a diphosphinic salt of the formula (II), and/or polymers of these,

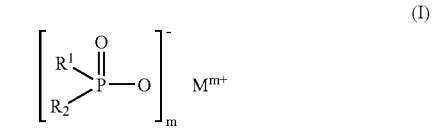

(I)

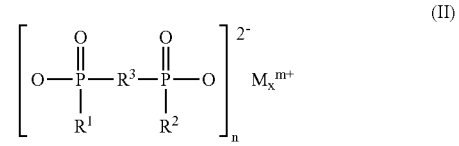

(II)

where
$R^1, R^2$ are identical or different and are $C_1$-$C_6$-alkyl, linear or branched, and/or aryl;
$R^3$ is $C_1$-$C_{10}$-alkylene, linear or branched, $C_6$-$C_{10}$-arylene, -alkylarylene or -arylalkylene;
M is Mg, Ca, Al, Sb, Sn, Ge, Ti, Zn, Fe, Zr, Ce, Bi, Sr, Mn, Li, Na, K, and/or a protonated nitrogen base;
m is 1 to 4; n is 1 to 4; x is 1 to 4,
and comprises, as component B, from 10 to 75% by weight of a nitrogen-containing synergist, and, as component C, from 10 to 75% by weight of a phosphorus/nitrogen flame retardant, the entirety of the components always being 100% by weight.

22 Claims, No Drawings

FLAME RETARDANT COMBINATION FOR THERMOPLASTIC POLYMERS

The present invention is described in the German priority application No. 102004009455.1, filed 27.02.2004, which is hereby incorporated by reference as is fully disclosed herein.

The invention relates to a flame retardant combination for thermoplastic polymers, and also to polymeric molding compositions which comprise these flame retardant combinations.

The salts of phosphinic acids (phosphinates) have proven to be effective flame-retardant additives in particular for thermoplastic polymers (DE-A-22 52 258 and DE-A-24 47 727). Calcium phosphinates and aluminum phosphinates have been described as particularly effective in polyesters, being less disadvantageous than for example the alkali metal salts in affecting the properties of the polymer molding composition materials (EP-A-0 699 708).

Synergistic combinations of phosphinates with certain nitrogen-containing compounds have also been found, and are more effective as flame retardants than the phosphinates alone in a large number of polymers (WO 97/39053, and also DE-A-197 34 437 and DE-A-197 37 727).

DE-A-196 14 424 describes phosphinates combined with nitrogen synergists in polyesters and polyamides. Among the effective synergists described are melamine and melamine compounds, which themselves also have some degree of action in certain thermoplastics, but are markedly more effective combined with phosphinates.

DE-A-1 99 33 901 describes phosphinates combined with reaction products of melamine and phosphoric acid, for example melamine polyphosphate, as flame retardants for polyesters and polyamides.

The action of the phosphinates and of the nitrogen synergists or the melamine/phosphoric acid reaction products is described in essence for the UL 94 vertical fire test. However, the action of the combined materials in particular thermoplastics remains unsatisfactory. Furthermore, the action in the IEC glow-wire test remains inadequate. The amounts which have to be added for the UL 94 test lead to polymer degradation and discoloration of the flame retardant plastics, a problem which has not yet been solved to good effect.

Because flame retardants have the chemical reactivity required to provide flame retarding at high temperatures, they can impair the processing stability of plastics. Examples of possible effects are increased polymer degradation, crosslinking reactions, gas evolution, and discoloration, these being effects which may not occur, or occur only to a lesser extent, when plastics are processed without flame retardant.

With a few exceptions, the processing of thermoplastics takes place in the melt. The attendant changes in structure and conditions bring about alterations of chemical structure in almost all plastics. The consequence can be crosslinking, oxidation, molecular-weight changes, and also resultant changes in physical and technical properties. In order to reduce the adverse effect on the polymers during processing, various additives are added, depending on the plastic. Stabilizers are generally added, and these suppress, or at least retard, the alteration processes, such as reactions involving crosslinking or involving degradation. Lubricants are also admixed with most plastics, the main function of these being to improve the flow behavior of the melt.

A wide variety of different additives is generally used simultaneously, each of these assuming one function. For example, antioxidants and stabilizers are used in order that the plastic withstand processing with no chemical degradation, and then be stable over a long period with respect to external effects, such as heat, UV light, weathering and oxygen (air). Lubricants not only improve flow behavior but also inhibit excessive adhesion of the plastics melt to hot machinery parts, and act as dispersing agents for pigments, fillers, and reinforcing materials.

The use of flame retardants can have an effect on the stability of the plastic during processing in the melt.

When no flame retardants are added, polyamides are generally stabilized by small amounts of copper halides, or else by aromatic amines and sterically hindered phenols, the main aim being to achieve long-term stability at high long-term service temperatures ("Plastics Additives Handbook", $5^{th}$ Edition, H. Zweifel (Ed.): CarlHanser Verlag, Munich, 2000, pages 80 to 84). Polyesters, too, require antioxidative stabilization in essence for long-term use, not for processing.

It was therefore an object of the present invention to provide flame retardant combinations for polyamides or polyesters which not only comply with various fire standards demanded in the electrical and electronics sector but also have a stabilizing action on the plastic. This object is achieved via the use of phosphinates with nitrogen-containing synergists and of phosphorus-nitrogen flame retardants, and also, if appropriate, addition of zinc compounds and of other additives, and of fillers and reinforcing materials.

The invention therefore provides a flame retardant combination for thermoplastic polymers which comprises, as component A, from 20 to 80% by weight of a phosphinic salt of the formula (I) and/or of a diphosphinic salt of the formula (II), and/or polymers of these,

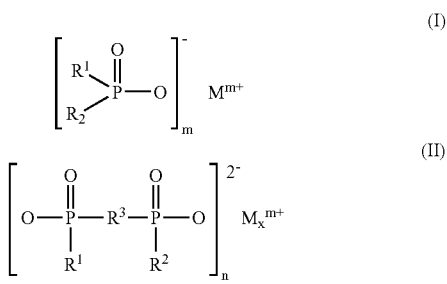

where
$R^1$, $R^2$ are identical or different and are $C_1$-$C_6$-alkyl, linear or branched, and/or aryl;
$R^3$ is $C_1$-$C_{10}$-alkylene, linear or branched, $C_6$-$C_{10}$-arylene, -alkylarylene or -arylalkylene;
M is Mg, Ca, Al, Sb, Sn, Ge, Ti, Zn, Fe, Zr, Ce, Bi, Sr, Mn, Li, Na, K, and/or a protonated nitrogen base;
m is 1 to 4;
n is 1 to 4;
x is 1 to 4, and comprises, as component B, from 10 to 75% by weight of a nitrogen-containing synergist, and, as component C, from 10 to 75% by weight of a phosphorus/nitrogen flame retardant, the entirety of the components always being 100% by weight.

Surprisingly, it has been found that inventive combinations of phosphinates and phosphorus-nitrogen flame retardants, such as melamine polyphosphate, exhibit markedly better glow-wire stability when certain nitrogen synergists, such as melamine cyanurate, are added. Stability during processing can be markedly improved via addition of zinc compounds, such as zinc borate, zinc oxide, or zinc stearate.

To improve processing stability, it is also possible to add certain oxides, hydroxides, carbonates, silicates, borates, stannates, mixed oxide hydroxides, oxide hydroxide carbonates, hydroxide silicates, or hydroxide borates, or a mixture of these substances. By way of example, use may be made of magnesium oxide, calcium oxide, aluminum oxide, manganese oxide, tin oxide, aluminum hydroxide, boehmite, dihydrotalcite, hydrocalumite, magnesium hydroxide, calcium hydroxide, calcium carbonate, zinc hydroxide, tin oxide hydrate, or manganese hydroxide.

The inventive combinations of flame retardants and zinc compounds reduce the discoloration of the plastics during processing in the melt and suppress the degradation of the plastics to give units having lower molecular weight. At the same time, flame retardancy is entirely retained.

Surprisingly, it has also been found that the inventive additions of zinc compounds completely eliminate smoke generation during extrusion and injection molding. M is preferably calcium, aluminum, or zinc.

Protonated nitrogen bases are preferably the protonated bases of ammonia, melamine, triethanolamine, in particular $NH_4^+$.

$R^1$ and $R^2$, identical or different, are preferably $C_1$-$C_6$-alkyl, linear or branched, and/or phenyl.

$R^1$ and $R^2$, identical or different, are particularly preferably methyl, ethyl, n-propyl, isopropyl, n-butyl, tert-butyl, n-pentyl, and/or phenyl.

$R^3$ is particularly preferably methylene, ethylene, n-propylene, isopropylene, n-butylene, tert-butylene, n-pentylene, n-octylene, or n-dodecylene.

Another preferred meaning of $R^3$ is phenylene or naphthylene.

Suitable phosphinates are described in WO97/39053, expressly incorporated herein by way of reference.

Particularly preferred phosphinates are aluminum phosphinates, calcium phosphinates, and zinc phosphinates.

The nitrogen-containing synergists (component B) preferably comprise those of the formulae (III) to (VIII), or a mixture of these

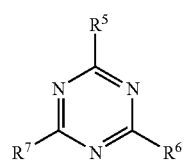
(III)

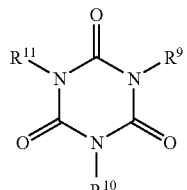
(IV)

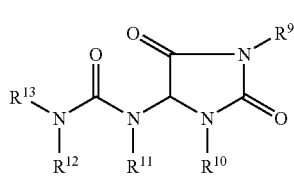
(V)

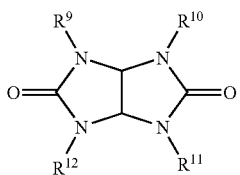
(VI)

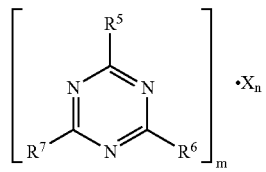
(VII)

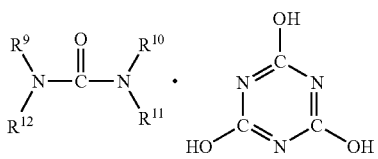
(VIII)

where
$R^5$ to $R^7$ are hydrogen, $C_1$-$C_8$-alkyl, $C_5$-$C_{16}$-cycloalkyl or -alkylcycloalkyl, optionally substituted with a hydroxy or a $C_1$-$C_4$-hydroxyalkyl function, $C_2$-$C_8$-alkenyl, $C_1$-$C_8$-alkoxy, -acyl, -acyloxy, $C_6$-$C_{12}$-aryl or -arylalkyl, —$OR^8$, or —$N(R^8)R^9$, including systems of alicyclic-N or aromatic-N type,
$R^8$ is hydrogen, $C_1$-$C_8$-alkyl, $C_5$-$C_{16}$-cycloalkyl or -alkylcycloalkyl, optionally substituted with a hydroxy or a $C_1$-$C_4$-hydroxyalkyl function, $C_2$-$C_8$-alkenyl, $C_1$-$C_8$-alkoxy, -acyl, -acyloxy, or $C_6$-$C_{12}$-aryl or -arylalkyl,
$R^9$ to $R^{13}$ are the same as the groups for $R^8$, or else —O—$R^8$,
m and n independently of one another are 1, 2, 3, or 4,
X is acids which can form adducts with triazine compounds (III);

or comprise oligomeric esters of tris(hydroxyethyl) isocyanurate with aromatic polycarboxylic acids.

The nitrogen-containing synergists preferably comprise benzoguanamine, tris(hydroxyethyl) isocyanurate, allantoin, glycoluril, melamine, melamine cyanurate, urea cyanurate, dicyandiamide, guanidine.

The nitrogen synergists preferably comprise condensates of melamine. Examples of condensates of melamine are melem, melam, or melon, or compounds of this type with a higher degree of condensation, or else mixtures of the same, and these can be prepared for example via a process as described in WO-A-96/16948.

The phosphorus/nitrogen flame retardants (component C) preferably comprise reaction products of melamine with phosphoric acid or with condensed phosphoric acids, or comprise reaction products of condensates of melamine with phosphoric acid or with condensed phosphoric acids, or else comprise a mixture of the products mentioned.

The reaction products with phosphoric acid or with condensed phosphoric acids are compounds which are produced via reaction of melamine or of the condensed melamine compounds such as melam, melem, or melon, etc., with phosphoric acid. Example of these are dimelamine phosphate, dimelamine pyrophosphate, melamine phosphate, melamine pyrophosphate, melamine polyphosphate, melam polyphosphate, melon polyphosphate, and melem polyphosphate, and mixed polysalts, e.g. those described in WO 98/39306.

Component C particularly preferably comprises melamine polyphosphate.

Component C preferably comprises nitrogen-containing phosphates of the formulae $(NH_4)_y H_{3-y} PO_4$ or $(NH_4 PO_3)_z$, where y is from 1 to 3 and z is from 1 to 10 000.

Component C preferably comprises ammonium hydrogenphosphate, ammonium dihydrogenphosphate, or ammonium polyphosphate.

Component C is preferably composed of at least two different phosphorus/nitrogen flame retardants.

The flame retardant and stabilizer combined preferably also comprises carbodiimides.

The flame retardant and stabilizer combined preferably also comprises, as component D, from 0.1 to 10% by weight of an organic or inorganic zinc compound or of a mixture of various zinc compounds, where the entirety of all of the components is always 100% by weight.

Component D preferably comprises zinc oxide, zinc borate, and/or zinc stannate.

The flame retardant and stabilizer combined preferably comprises from 50 to 80% by weight of component A, from 10 to 75% by weight of component B, and from 10 to 75% by weight of component C.

The flame retardant and stabilizer combined particularly preferably comprises from 50 to 80% by weight of component A, from 10 to 40% by weight of component B, and from 10 to 40% by weight of component C.

The flame retardant and stabilizer combined preferably comprises from 50 to 80% by weight of component A, from 10 to 75% by weight of component B, and from 10 to 75% by weight of component C, and from 0.1 to 10% by weight of component D.

The flame retardant and stabilizer combined particularly preferably comprises from 50 to 80% by weight of component A, from 10 to 40% by weight of component B, and from 10 to 40% by weight of component C, and from 0.1 to 7% by weight of component D.

The quantitative proportions of components A, B, C, and, if appropriate, D in the flame retardant combination are in essence dependent on the intended application sector, and can vary within wide limits.

The invention also provides a flame-retardant plastics molding composition comprising the inventive flame retardant and stabilizer combined.

The plastic preferably comprises thermoplastic polymers of the type represented by HI (high-impact) polystyrene, polyphenylene ethers, polyamides, polyesters, polycarbonates, and blends or polyblends of the type represented by ABS (acrylonitrile-butadiene-styrene) or PC/ABS (polycarbonate/acrylonitrile-butadiene-styrene), or PPE/HI PS (polyphenylene ether/HI polystyrene) plastics.

The plastic preferably comprises polyamides, polyesters, or PPE/HIPS blends.

The total amount used of the flame retardant and stabilizer combined in the plastics molding composition is preferably from 2 to 50% by weight, based on the plastics molding composition.

The total amount used of the flame retardant and stabilizer combined in the plastics molding composition is preferably from 10 to 30% by weight, based on the plastics molding composition.

Finally, the invention also provides polymer moldings, polymer films, polymer filaments, and polymer fibers comprising the inventive flame retardant and stabilizer combined.

The polymer moldings, polymer films, polymer filaments, and polymer fibers comprise HI (high-impact) polystyrene, polyphenylene ethers, polyamides, polyesters, polycarbonates, and blends or polyblends of the type represented by ABS (acrylonitrile-butadiene-styrene), or PC/ABS (polycarbonate/acrylonitrile-butadiene-styrene).

The polymer moldings, polymer films, polymer filaments, and polymer fibers preferably comprise a total amount of from 2 to 50% by weight of the flame retardant combination, based on the polymer content.

The polymer moldings, polymer films, polymer filaments, and polymer fibers particularly preferably comprise a total amount of from 10 to 30% by weight of the flame retardant and stabilizer combined, based on the polymer content.

In one particular embodiment, the polymer moldings, polymer films, polymer filaments, and polymer fibers comprise from 2 to 30% by weight of the flame retardant and stabilizer combined, composed of from 50 to 80% by weight of component A, of from 10 to 40% by weight of component B, of from 10 to 40% by weight of component C, and of from 0 to 10% by weight of component D, based on the polymer content.

The above mentioned additives may be introduced into the plastic in a very wide variety of steps of the process. For example, in the case of polyamides or polyesters it is possible for the additives to be mixed into the polymer melt as early as the start of the polymerization/polycondensation process, or at its end, or in a subsequent compounding process. There are moreover processes in which the additives are not added until later. This method is particularly used when pigment masterbatches or additive masterbatches are used. Another possibility is that in particular pulverulent additives are applied in a drum to the polymer pellets, which may retain heat from the drying process.

The flame retardant and stabilizer combined preferably takes the form of pellets, flakes, fine grains, powder, and/or micronizate.

The flame retardant and stabilizer combined preferably takes the form of a physical mixture of the solids, a melt mixture, a compactate, an extrudate, or a masterbatch.

The mixture is preferably used in a molding composition of a polyamide or of a polyester. Examples of suitable polyamides are described in DE-A-199 20 276.

The polyamides are preferably those of amino acid type and/or of diamine/dicarboxylic acid type.

The polyamides are preferably nylon-6, nylon-12, partly aromatic polyamides, and/or nylon-6,6.

Preference is given to polyamides which are unaltered, colored, filled, unfilled, reinforced, unreinforced, or else modified in some other way.

The polyesters preferably comprise polyethylene terephthalate or polybutylene terephthalate.

Preference is given to polyesters which are unaltered, colored, filled, unfilled, reinforced, unreinforced, or else modified in some other way.

Carbodiimides or chain extenders, e.g. of bisoxazoline type, may also be present; epoxy compounds may also be present.

If appropriate, other additives may be added to the polymer. Additives which may be added comprise waxes, light stabilizers, other stabilizers, antioxidants, antistatic agents, or a mixture of these additives.

Preferred stabilizers which may be used are phosphonites and phosphites or carbodiimides.

The above mentioned additives may also be added to the flame retardant and stabilizer combined.

EXAMPLES

1. Components Used

Commercially available polymers (pellets):

Nylon-6,6 (GRPA 6.6): ®Durethan AKV 30 (Bayer AG, D) comprising 30% of glass fibers.

Flame retardant components (pulverulent):

Component A:

Aluminum diethylphosphinate, hereinafter termed DEPAL.

Component B:

Melapur MC 50 (melamine cyanurate,) hereinafter termed MC, Ciba Melapur, NL

Urea cyanurate, hereinafter termed UC, Agrolinz, Linz, Austria

Component C:

Melapur 200 (melamine polyphosphate), hereinafter termed MPP, Ciba Melapur, NL

Melapur MP (melamine pyrophosphate), hereinafter termed MP, Ciba Melapur, NL

Component D:

Zinc borate, hereinafter termed ZB, Borax, USA

Liga 101 zinc stearate, hereinafter termed ZSt, Peter Greven Fettchemie, D

2. Preparation, Processing, and Testing of Flame-Retardant Plastics Molding Compositions The flame retardant components were mixed in the ratio stated in the tables with the polymer pellets and, if appropriate, with the stabilizer, and incorporated at temperatures of from 260 to 310° C. (GRPA 6.6) or from 240 to 280° C. (GRPBT) in a twin-screw extruder (Leistritz LSM 30/34). The homogenized polymer strand was drawn off, cooled in a water bath, and then pelletized.

After adequate drying, the molding compositions were processed in an injection molding machine (Arburg 320° C. Allrounder) at melt temperatures of from 270 to 320° C. to give test specimens, and tested and classified for flame retardancy on the basis of the UL 94 test (Underwriters Laboratories). Glow-wire resistance was determined to IEC 60695.

Flowability of the molding compositions was determined by determining melt volume index (MVR) at 275° C./2.16 kg. A marked rise in the MVR value indicates polymer degradation.

For reasons of comparability, unless otherwise stated, all of the experiments in each series were carried out under identical conditions (temperature programs, screw geometries, injection-molding parameters, etc.).

Table 1 shows comparative examples using a flame retardant combination based on aluminum diethylphosphinate (DEPAL) and on the nitrogen-containing synergist melamine cyanurate or urea cyanurate, and on the phosphorus-nitrogen flame retardants melamine polyphosphate (MPP) and, respectively, melamine pyrophosphate (MP) alone or in duple combinations.

The results of the examples using the flame retardant mixture of the invention are listed in Tables 2 and 3. All of the amounts stated are % by weight, and are based on the plastics molding composition inclusive of the flame retardant combination and of additives.

From comparative examples it can be seen that combining Depal with nitrogen synergist or combining Depal with phosphorus-nitrogen flame retardant achieves a GWIT of only 700° C. However, the GWIT demanded for unsupervised household devices and electrical currents above 0.2 A is 775° C. The UL 94 fire classifcation V-0 is achieved, however.

The examples show that the inventive additions (mixture composed of the components phosphinate, nitrogen synergist and phosphorus-nitrogen flame retardant) increase the glow-wire resistance of the polyamides. At a constant total flame retardant addition rate, only the combinations composed of three substances can achieve GWIT of 775° C.

Incorporation of the flame retardants into PA 6.6 leads to polymer degradation, discernible from high MVR values, and gray-brown discoloration of the molding compositions, discernible from a high yellowness index.

If an inventive flame retardant and stabilizer combined is now used, composed of phosphinate, nitrogen synergist, phosphorus-nitrogen flame retardant, and zinc compound (E8, E9, E10), marked stabilization of the flame-retardant polyamide melt is then found, as is substantially reduced discoloration of the test specimens, discernible from lower MVR and yellowness index values.

TABLE 1

Comparative examples (experimental series 1): Flame-retardant molding compositions with the components as individual additives in glass fiber-reinforced PA 6.6.

| Comparison | DEPAL [%] | MPP [%] | MP [%] | MC [%] | UC [%] | UL 94 classification (0.8 mm) | GWIT/IEC 60695-2-13 [° C.] |
|---|---|---|---|---|---|---|---|
| c1 | 0 | 0 | 0 | 0 | 0 | n.c.**) | 550 |
| c2 | 30 | 0 | 0 | 0 | 0 | c-0 | 700 |
| c3 | 0 | 30 | 0 | 0 | 0 | c-0 | 700 |
| c4 | 0 | 0 | 30 | 0 | 0 | c-0 | 700 |
| c5 | 0 | 0 | 0 | 30 | 0 | c-2 | 700 |
| c6 | 0 | 0 | 0 | 0 | 30 | c-2 | 700 |
| c7 | 15 | 15 | 0 | 0 | 0 | c-0 | 700 |
| c8 | 0 | 15 | 0 | 0 | 15 | c-2 | 700 |
| c9 | 15 | 0 | 0 | 0 | 15 | c-0 | 700 |

*) of test specimen, melt temperature during injection molding: 300° C.
**) n.c. = not classifiable

TABLE 2

Inventive examples: Flame-retardant molding compositions with combination of DEPAL with nitrogen synergist and phosphorus-nitrogen flame retardant in glass fiber-reinforced PA 6.6.

| Comparison | DEPAL [%] | MPP [%] | MP [%] | MC [%] | UC [%] | UL 94 classification (0.8 mm) | GWIT/IEC 60695-2-13 [° C.] |
|---|---|---|---|---|---|---|---|
| e1 | 10 | 10 | 0 | 10 | 0 | c-0 | 775 |
| e2 | 10 | 0 | 10 | 10 | 0 | c-0 | 775 |
| e3 | 10 | 10 | 0 | 0 | 10 | c-0 | 775 |
| e4 | 10 | 5 | 0 | 15 | 0 | c-0 | 775 |
| e5 | 10 | 5 | 0 | 5 | 0 | c-0 | 775 |
| e6 | 10 | 0 | 5 | 0 | 10 | c-0 | 775 |

TABLE 3

Inventive examples: Flame-retardant molding compositions with combination of DEPAL with nitrogen synergist and phosphorus-nitrogen flame retardant, and zinc compound in glass fiber-reinforced PA 6.6.

| Comparison | DEPAL [%] | MPP [%] | MC [%] | ZB [%] | ZSt [%] | NVR 275° C./2.16 kg | Yellowness index |
|---|---|---|---|---|---|---|---|
| e7 | 10 | 10 | 10 | 0 | 0 | 19 | 25 |
| e8 | 10 | 10 | 10 | 2 | 0 | 12 | 13 |
| e9 | 10 | 10 | 10 | 0 | 2 | 13 | 11 |
| e1 | 10 | 10 | 10 | 1 | 1 | 12 | 11 |

The invention claimed is:

1. A flame retardant and stabilizer combined, for thermoplastic polymers, which comprises, as component A, from 20 to 80% by weight of a phosphinic salt of the formula (I) a diphosphinic salt of the formula (II), a polymer of the phosphinic salt of the formula (I), a polymer of the diphosphinic salt of the formula (II), or a mixture thereof,

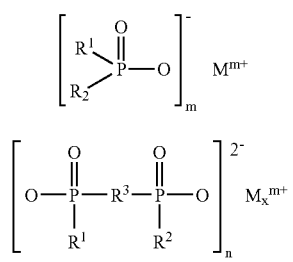

where
R$^1$, R$^2$ are identical or different and are C$_1$-C$_6$-alkyl, linear or branched, or aryl;
R$^3$ is C$_1$-C$_{10}$-alkylene, linear or branched, C$_6$-C$_{10}$-arylene, -alkylarylene or -arylalkylene;
M is Mg, Ca, Al, Sb, Sn, Ge, Ti, Zn, Fe, Zr, Ce, Bi, Sr, Mn, Li, Na, K, or a protonated nitrogen base;
m is 1 to 4;
n is 1 to 4;
x is 1 to 4, as component B, from 10 to 40% by weight of a condensate of melamine selected from the group consisting of melem, melam, melon, and components thereof having higher condensation levels, and, as component C, from 10 to 40% by weight of a melamine polyphosphate, melem polyphosphate, melam polyphosphate, melon polyphosphate or their mixture thereof the entirety of the components always being 100% by weight.

2. The flame retardant and stabilizer combined, as claimed in claim 1, wherein R$^1$ and R$^2$ are identical or different, and are C$_1$-C$_6$-alkyl, linear or branched, or phenyl.

3. The flame retardant and stabilizer combined, as claimed in claim 1, wherein R$^1$ and R$^2$ are identical or different and are methyl, ethyl, n-propyl, isopropyl, n-butyl, tert-butyl, n-pentyl or phenyl.

4. The flame retardant and stabilizer combined, as claimed in claim 1, wherein R$^3$ is methylene, ethylene, n-propylene, isopropylene, n-butylene, tert-butylene, n-pentylene, n-octylene, n-dodecylene; phenylene, naphthylene; methylphenylene, ethylphenylene, tert-butylphenylene, methylnaphthylene, ethylnaphthylene, tert-butylnaphthylene, phenylmethylene, phenylethylene, phenylpropylene, or phenylbutylene.

5. The flame retardant and stabilizer combined, as claimed in claim 1, wherein M is calcium, aluminum, or zinc.

6. The flame retardant and stabilizer combined, as claimed in claim 1, wherein component C is a nitrogen-containing phosphate of the formulae (NH$_4$PO$_3$)$_z$, where z is from 1 to 10 000.

7. The flame retardant and stabilizer combined, as claimed in claim 1, wherein component C is ammonium polyphosphate.

8. The flame retardant and stabilizer combined, as claimed in claim 1, wherein component C is at least two different melamine polyohosphates.

9. The flame retardant and stabilizer combined, as claimed in claim 1, further comprising carbodiimides.

10. The flame retardant and stabilizer combined, as claimed in claim 1, further comprising, as component D, from 0.1 to 10% by weight of at least one organic or inorganic zinc compound or a mixture thereof.

11. The flame retardant and stabilizer combined, as claimed in claim 10, wherein component D is zinc oxide, zinc borate, zinc stannate or mixtures thereof.

12. The flame retardant and stabilizer combined, as claimed in claim 10, comprising from 50 to 80% by weight of component A, from 10 to 40% by weight of component B, from 10 to 40% by weight of component C, and from 0.1 to 10% by weight of component D.

13. The flame retardant and stabilizer combined, as claimed in claim 10, comprising from 50 to 80% by weight of component A, from 10 to 40% by weight of component B, from 10 to 40% by weight of component C, and from 0.1 to 7% by weight of component D.

14. A flame-retardant plastic molding composition, comprising a flame retardant and stabilizer combined, as claimed in claim 1.

15. The flame-retardant plastic molding composition as claimed in claim 14, wherein the plastic is a thermoplastic polymer.

16. The flame-retardant plastics molding composition as claimed in claim 14, wherein the plastic is a polyamide, polyester or polyphenylene ether/high impact polystyrene blend.

17. The flame-retardant plastic molding composition as claimed in claim 14, comprising from 2 to 50% by weight of the flame retardant and stabilizer combined, based on the plastics molding composition.

18. The flame-retardant plastic molding composition as claimed in claim 15, comprising from 10 to 30% by weight of the flame retardant and stabilizer combined, based on the plastics molding composition.

19. A polymer article comprising a flame retardant and stabilizer combined, as claimed in claim 1.

20. The polymer article as claimed in claim 19, wherein the polymer is selected from the group consisting of high impact polystyrene, polyphenylene ethers, polyamides, polyesters, polycarbonates, and blends or polyblends of acrylonitrile-butadiene-styrene, or polycarbonate/acrylonitrile-butadiene-styrene.

21. The polymer article as claimed in claim 19, comprising from 2 to 50% by weight of the flame retardant and stabilizer combined, based on the polymer content.

22. The polymer article as claimed in claim 19, comprising from 10 to 30% by weight of the flame retardant and stabilizer combined, based on the polymer content.

* * * * *